United States Patent [19]

Scheer et al.

[11] Patent Number: 5,228,813

[45] Date of Patent: Jul. 20, 1993

[54] TOOL FOR USE IN MACHINE TOOLS

[75] Inventors: Gerhard Scheer, Loechgau; Eberhard Schneider, Besigheim, both of Fed. Rep. of Germany

[73] Assignee: Komet Prazisionswerkzeuge Robert Breuning GmbH, Besigheim, Fed. Rep. of Germany

[21] Appl. No.: 834,247

[22] PCT Filed: Jul. 14, 1990

[86] PCT No.: PCT/EP90/01156

§ 371 Date: Feb. 13, 1992

§ 102(e) Date: Feb. 13, 1992

[87] PCT Pub. No.: WO91/02615

PCT Pub. Date: Mar. 7, 1991

[30] Foreign Application Priority Data

Aug. 16, 1989 [DE] Fed. Rep. of Germany ........ 3927060

[51] Int. Cl.$^5$ .............................................. B23B 51/00
[52] U.S. Cl. ..................... 408/178; 408/153; 408/173
[58] Field of Search ............... 408/153, 173, 178, 147, 408/150, 151

[56] References Cited

U.S. PATENT DOCUMENTS

| 3,613,192 | 10/1971 | Tanabe et al. | 29/26 |
| 4,467,679 | 8/1984 | Johne et al. | 408/150 X |

FOREIGN PATENT DOCUMENTS

| 688315 | 2/1940 | Fed. Rep. of Germany . |
| 3128047 | 1/1983 | Fed. Rep. of Germany . |
| 3344800 | 3/1985 | Fed. Rep. of Germany . |

*Primary Examiner*—Steven C. Bishop
*Attorney, Agent, or Firm*—Flynn, Thiel, Boutell & Tanis

[57] ABSTRACT

A tool, in particular a fine-turning boring bar, for use in machine-tools, includes a shank part (16) which can be coupled to a rotating tool spindle, a head part (10) which is secured to the shank part (16) so as to remain fixed during rotation and which can be adjusted transversely with respect to the shank part (16), and a cutting support (20) which can be radially adjusted for coarse positioning purposes. Cylindrical fitting pins (28, 30) provided with radial face grooves (36, 38) are formed facing each other on the shank part (16) and the head part (10). A cross-coupling element (12) arranged between the front ends of the fitting pins (28, 30) has radially mobile pairs of claws (40, 42) which extend axially from both sides and which engage in mutually perpendicular face grooves (36, 38) in the fitting pins (28, 30). The two fitting pins (28, 30) also engage in mutually eccentric fitting holes (32, 34) of an eccentric sleeve (18) which can rotate with respect to the head part (10) and the shank part (16). The head part (10) and the shank part (16) are clamped temporarily, with radial play, by the cross-coupling element (12) and the eccentric sleeve (18) and then interconnected by means of a clamping anchor (14) which passes through the bore holes in the shank part (16), rotates in a thread (58) in the head part (10) and rests against an abutment (62, 64, 66) in the region of the shank part.

18 Claims, 3 Drawing Sheets

TOOL FOR USE IN MACHINE TOOLS

FIELD OF THE INVENTION

The invention relates to a tool, in particular a fine-turning boring bar, for use in machine tools, comprising a shank part which can be coupled to a rotating tool spindle, a head part which is connected to the shank part so as to rotate therewith and can be adjusted transversely with respect to the shank part, and a cutting support arranged in the head part.

BACKGROUND OF THE INVENTION

The adjusting mechanism for the fine adjustment of the head part requires relatively much space in tools of this type. Since the structural parts of the adjusting mechanism cannot be randomly reduced in size, the tool diameter has strict requirements. In addition, the precision of the fine feed in conventional adjusting mechanisms often leaves much to be desired.

SUMMARY OF THE INVENTION

The basic purpose of the invention is to provide a tool of the above-mentioned type which, even in the case of a very small tool diameter, has a high precision feed and a sufficient stiffness.

To attain this purpose, the invention suggests that cylindrical fitting pins are formed on the shank part and on the head part of the tool, which fitting pins face one another and have radially extending face grooves at their mutually adjacent ends, that between the mutually adjacent ends of the fitting pins there is arranged a cross-coupling element with mobile coupling claws projecting axially from both sides thereof and extending relatively radially movably into the face grooves of the fitting pins, which face grooves are aligned perpendicularly with respect to one another, that the two fitting pins extend into fitting holes of an eccentric sleeve rotatable relative to the fitting pins, which fitting holes are eccentric to one another, and that the head part and the shank part are connected, with the intermediate clamping of the coupling element and/or the eccentric sleeve, by means of a clamping anchor extending with radial clearance through holes in the shank part and in the cross-coupling element and engaging a thread on the head part and supported against an abutment in the area of the shank part.

The fitting holes, which are eccentric to one another, are advantageously arranged such that the longitudinal axis of the fitting hole receiving the fitting pin of the shank part is aligned with the axis of rotation of the tool and that the longitudinal axis of the fitting hole receiving the fitting pin of the head part is parallel and radially offset with respect to the axis of rotation of the tool.

The cross-coupling element is advantageously constructed as an annular piece with mobile pairs of claws axially projecting to both sides thereof and angularly spaced at 90° with respect to one another. The eccentric movement is, during rotation of the eccentric sleeve, converted into a radial sliding movement between the head part and the shank part by the cross-coupling element. The converting of the movement requires a certain freedom of play in the coupling area and a slight tilting of the cross-coupling element relative to the tool axis. In order to make this possible, the claw flanks of the cross-coupling element are aligned not exactly parallel from their root toward the tip but are inclined at an angle. Also, the axially facing bearing surfaces on the annular piece are not flat but form an obtuse conical surface.

The shank part has, according to a preferred development of the invention, an axial hole stepped toward the side of a pin, in the enlarged part of which stepped hole a head of the clamping anchor is guided. Spring means, advantageously constructed as a set of springs, are arranged between the oppositely lying shoulders of the stepped hole and of the clamping-anchor head. The spring means assure that the eccentric sleeve and the cross-coupling element are clamped, when the clamping anchor is tightened, at a certain force between the head part and the shank part of the tool and are thus adjusted free of play, however, are still rotatable or rather transversely movable relative to these parts. A spacer ring can additionally be arranged between the clamping-anchor head and the set of springs.

According to a further advantageous development of the invention, the stepped hole is closed off by an end screw on the side of the clamping anchor head. The inside of the stepped hole between the clamping-anchor head and the end screw can be filled with a fill piece preferably consisting of a heavy material, like lead. This fill piece has, on the one hand, the function of assuring that the clamping anchor will not rotate within the hole. Furthermore, the fill piece is used to stiffen the shank part and to improve the damping behavior.

A further preferred embodiment of the invention provides that an axially facing end of the shank part, which end faces the spindle, is connected to a coupling part which can be coupled to a tool spindle by means of a fitting pin axially projecting beyond a flat surface oriented perpendicular with respect to the axis of rotation of the tool.

The clamping anchor and, if necessary, the fill piece, the end screw and the coupling part have advantageously an axial cooling-medium channel for supplying cooling-medium to the chip flute. An adjusting wrench can be introduced through the cooling-medium channel to adjust the clamping force of the clamping anchor.

In order to prevent cooling fluid from exiting the cooling-medium channel, the clamping-anchor head can have a peripheral groove in order to receive therein an elastic gasket ring resting against the inner surface of the stepped hole. As an alternative, it is possible for the gasket ring to be arranged between oppositely lying faces of the end screw and the clamping-anchor head, with it being supported advantageously in radial direction on an axially projecting hollow pin formed on the clamping-anchor head. A sealing of the cooling-medium channel between the shank part and the coupling part is assured by an elastic gasket ring arranged between oppositely lying faces of the shank part and the coupling part and supported in radial direction on the end screw projecting axially beyond the shank part.

In order to make the rotation of the eccentric sleeve easier, the eccentric sleeve is advantageously provided with an outer multi-surface section for the engagement of an adjusting wrench. The eccentric sleeve has furthermore a scale ring at its end facing the shank part or the head part, on which scale ring the path of adjustment can be read.

In order to enable a coarse positioning, the cutting support is fixedly and radially adjustably arranged, for example, by means of a locking screw on the head part.

BRIEF DESCRIPTION OF THE DRAWINGS

The invention will be discussed in greater detail hereinafter in connection with two exemplary embodiments schematically illustrated in the drawings, in which.

DETAILED DESCRIPTION

Figure 1:
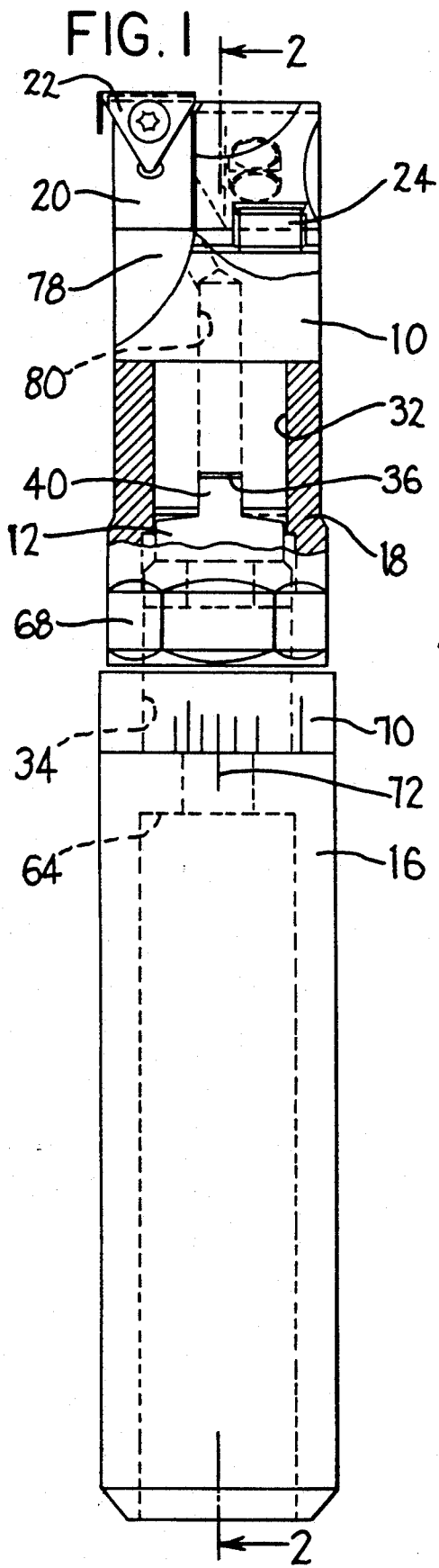
FIG. 1 is a partially cross-sectioned side view illustration of a fine-turning boring bar.

The fine-turning tools illustrated in the drawings consist essentially of a head part 10, a shank part 16 connected to the head part through a cross-coupling element 12 and a clamping anchor 14 and an eccentric sleeve 18 rotatable relative to the head part and the shank part. A cutting support 20 carrying a throw-away insert 22 is radially adjustable in the head part for the purpose of the coarse feeding by means of a threaded pin 24 and is fixably arranged by means of a clamping screw 26.

Each end of the eccentric sleeve 18 has a fitting hole 32 and 34 respectively facing the head part 10 and the shank part 16. The fitting holes 32 and 34 are arranged eccentrically to one another, with the longitudinal axis of the fitting hole 34 on the side of the shank part being aligned with the axis of rotation of the tool while the longitudinal axis of the fitting hole 32 on the side of the head part is arranged eccentrically with respect to the axis of rotation of the tool. Axially aligned cylindrical fitting pins 28 or 30 respectively formed on the head part 10 and on the shank part 16 extend into the fitting holes 32 or 34 from opposite ends. The fitting pins 28, 30 have radially aligned face grooves 36, 38 at their mutually opposing ends. Pairs of radially extending, mobile claws 40, 42 project axially toward opposite sides of the cross-coupling element 12 and are received into the face grooves 36, 38. As can be seen particularly in FIG. 3, the mobile pairs of claws 40, 42 are aligned perpendicularly to one another at the cross-coupling element 12. In addition, the face grooves 36, 38 are, in the mounted state, aligned perpendicularly to one another at the two fitting pins 28, 30. The center hole 44 in the cross-coupling element 12 is designated for the passage of the clamping anchor 14.

The shank part 16 contains a continuous axially extending stepped hole 46 into which the clamping anchor 14, with its head 48 and threaded shank 50, can be introduced for the purpose of assembly. The threaded shank 50 attached to the head 48 extends with clearance through the wide part 46 of the stepped hole in the shank part 16, through the narrow part 56 of the stepped hole in the fitting pin 30 and the center hole 44 in the cross-coupling element and is screwed into a tapped hole 58 in the fitting pin 28 of the head part 10. Furthermore, the head 48 has for this purpose a hexagonal recess 60 into which a hexagonal wrench can be inserted from the exterior. A set of springs 66 is arranged between a compensating plate 62 resting on the clamping-anchor head 48 and an annular shoulder 64 of the stepped hole 46. The set of springs 66 makes sure that the tool parts 10, 16 to be connected are clamped together without any play, but that a turning of the eccentric sleeve 18 and a moving of the cross-coupling element 12 relative to the head part 10 and shank part 16 are still possible. The eccentric sleeve 18 is turned when the shank part 16 is fixedly held by means of an adjusting wrench engaging the peripheral hexagon 68. The cross-coupling element 12 has, besides the purpose of providing a turning coupling between the shank part 16 and the head part 10, the purpose of converting, during a turning of the eccentric sleeve 18, the eccentric movement between the holes 32 and 34 into a sliding movement between the head part 10 and the shank part 16. The path of movement relative to a zero line 72 on the shank part can thereby be read on a scale 70 on the eccentric sleeve 18.

A central cooling-medium channel 80 passing through the boring tool and terminating in a chip flute 78 assures a supplying of the machining area with a cooling medium.

Figure 2:
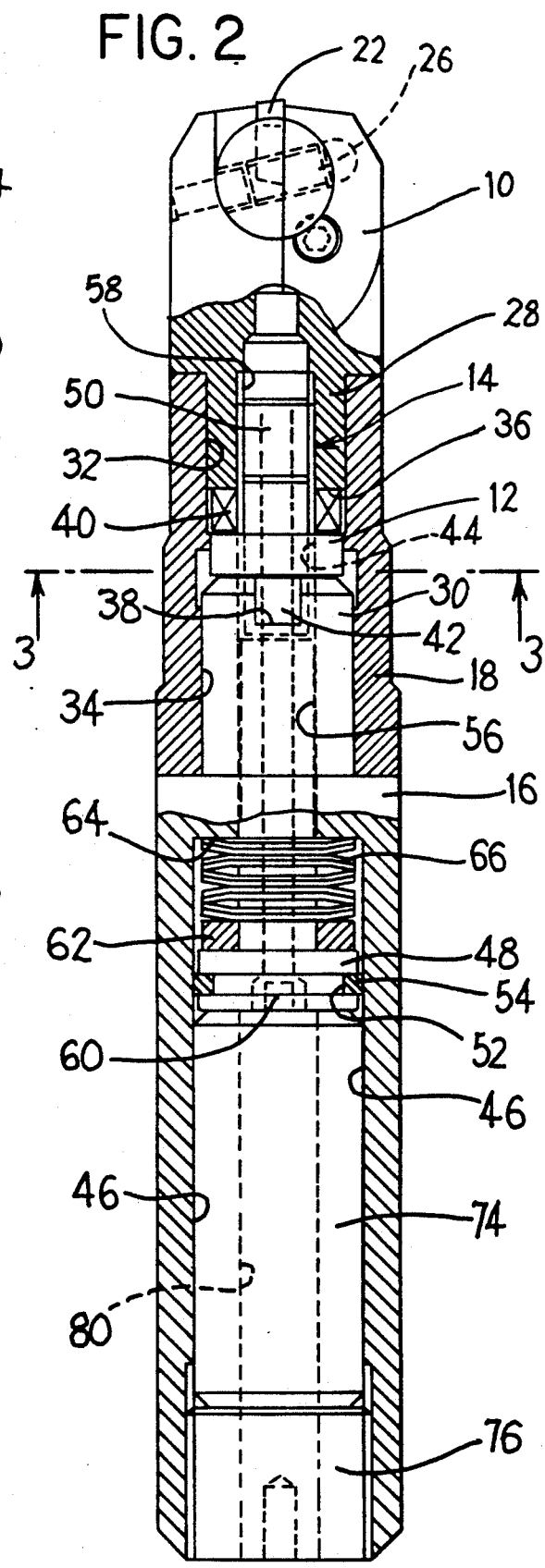
FIG. 2 is a cross-sectional view taken along the line 2—2 of FIG. 1.
Figure 3:
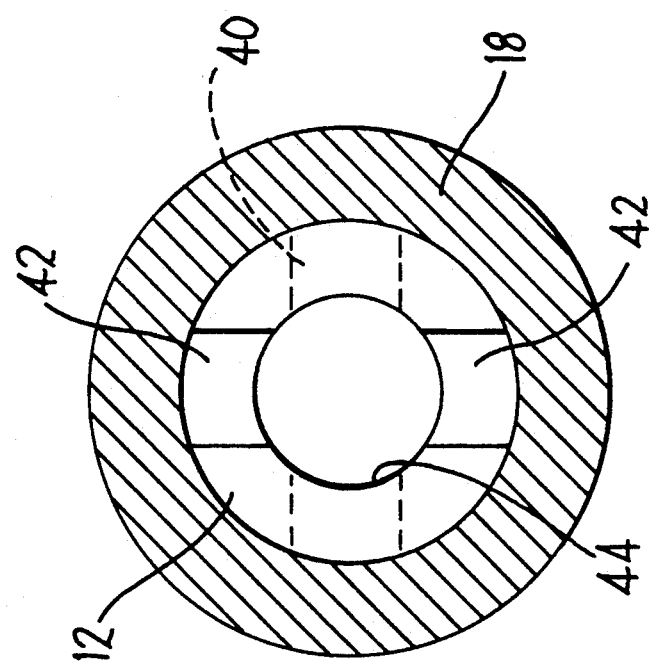
FIG. 3 is a cross-sectional view taken along the line 3—3 of FIG. 2.

The fine-turning boring bar illustrated in FIGS. 1 to 3 has a shank part 16 which is cylindrical over its entire length and the end of which, which end is remote from the head part 10, can be clamped in a tool chuck on a tool spindle. The open end of the shank part 16 is closed off by a fill piece 74 and an end screw 76 screwed into an internal thread in the stepped hole 46. The parts 74, 76, on the one hand, assure that the clamping anchor 14 will not rotate within the hole and, on the other hand, the fill piece 74 consisting of a heavy metal, like lead, is used to improve the damping characteristics of the boring bar and to reinforce the shank part 16. The cooling-medium channel 80 leading to the chip flute 78 is composed of holes in the parts 76, 74, 14, 10. An O-ring 54 arranged in a peripheral groove 52 of the clamping-anchor head 48 assures a liquid-tight guiding of the clamping-anchor head on the inner surface of the enlarged part of the stepped hole 46 and thus a leakage-free sealing of the cooling-medium channel 80 between the clamping-anchor head 48 and the chip flute 78.

Figure 4:
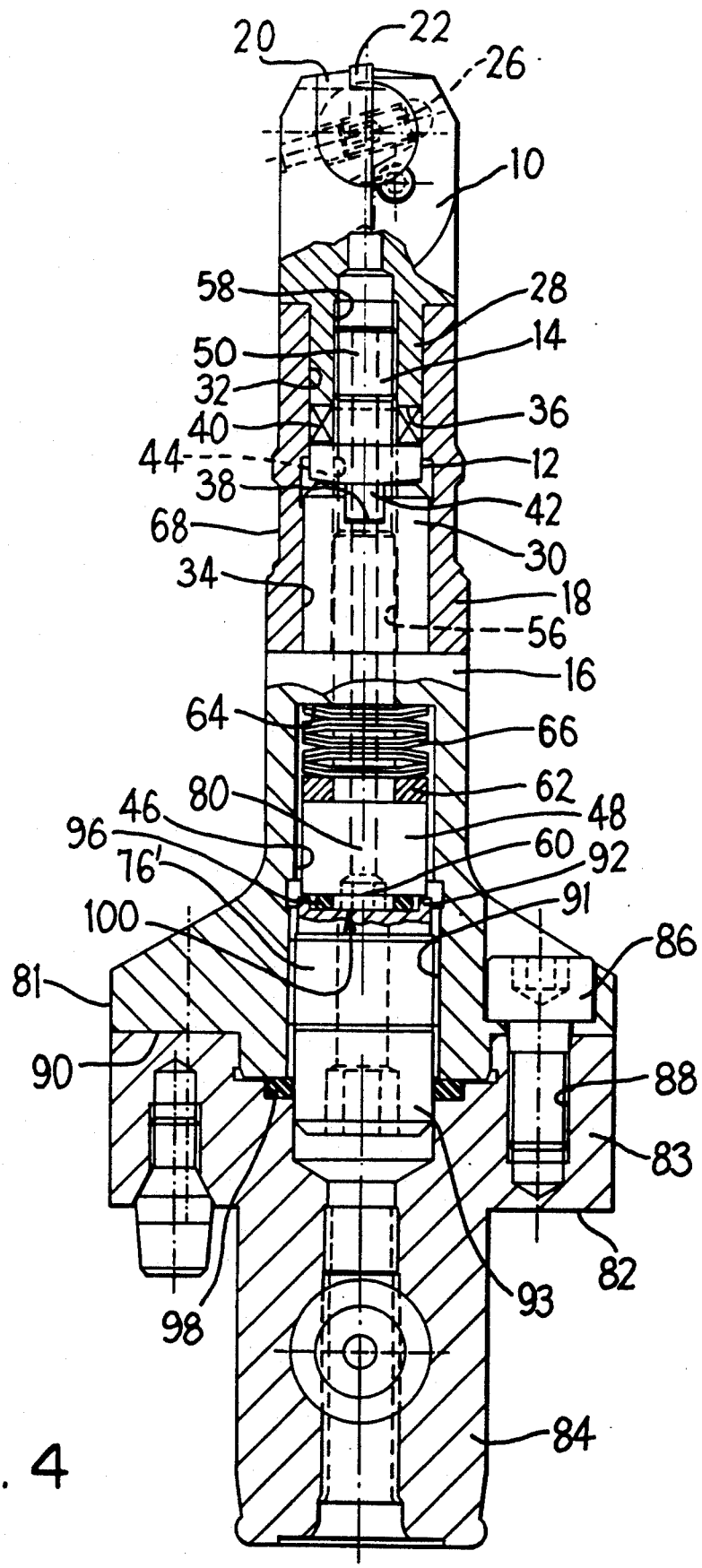
FIG. 4 is a cross-sectional view of a modified exemplary embodiment of a fine-turning boring bar corresponding with FIG. 2.

The shank part 16 is, in the exemplary embodiment illustrated in FIG. 4, constructed to include an enlarged diameter flange 81 at its end remote from the head part 10 connected to a coupling part 83, the axially projecting fitting pin 84 of which, which fitting pin is surrounded by an annular flat surface 82, can be clamped in a corresponding fitting hole of a machine tool spindle (not illustrated) or a modular intermediate piece by axially pressing the flat surface 82 against a corresponding flat surface surrounding the fitting hole. The flange 81 and the coupling part 83 are connected by four holding screws 86 extending into blind holes 88 in the coupling part 83 and by two cylindrical pins (not illustrated), which act as a lock against relative rotation, projecting in axial direction beyond the face 90 of the shank part 16 and are received into corresponding fitting holes in the coupling part 83.

An end screw 76', which is screwed into an internal thread 91 in the stepped bore 46 and is clamped with an annular surface 92 thereof against the face of the clamping-anchor head 48 in the shank part 16 facing the spindle, to secure the clamping anchor 14 against automatically from turning, and serves with its part 93 projecting in axial direction beyond the flange 81 as a guide 93 during a connecting of the shank part 16 to the coupling part 83. The central cooling-medium channel 80 formed by the holes in the coupling part 83, in the end screw 76', in the clamping anchor 14 and in the head part 10 is sealed by two O-rings 96 and 98 clamped against faces of the clamping-anchor head 48 and the end screw 76' and faces the shank part 16 and the coupling piece 84.

The O-rings are respectively supported in radial direction on an axially projecting hollow pin 100 formed on the clamping-anchor head 48 and on the guide 93 of the end screw 76'.

An adjustment of the clamping anchor 14 to be carried out in order to change the clamping force can be done with the help of an adjusting wrench that can extend through the cooling-medium holes in the coupling part 83 and in the end screw 76' and into the hexagonal recess 60 in the clamping-anchor head 48.

Compared with the boring bar with the cylindrical shank part illustrated in FIGS. 1 to 3, the boring tool according to FIG. 4 has a greater stiffness and is at the same time shorter.

The embodiments of the invention in which an exclusive property or privilege is claimed are defined as follows:

1. In a fine-turning boring bar for use in machine tools, comprising a shank part which can be coupled to a rotating tool spindle, a head part which is secured to the shank part so as to rotate therewith and is adjustable transversely with respect to the shank part, and a cutting support arranged in the head part, the improvement wherein cylindrical fitting pins, which face one another and have radially extending face grooves at their mutually adjacent ends, are formed on the shank part and on the head part, wherein between the mutually adjacent ends of the fitting pins there is arranged a cross-coupling element with mobile coupling claws projecting axially from both sides thereof and are radially movably received into the face grooves on the fitting pins, which face grooves are aligned perpendicularly with respect to one another, wherein the two fitting pins are received into fitting holes of an eccentric sleeve which is rotatable relative to the fitting pin, which fitting holes are eccentric to one another, and wherein the head part and the shank part are connected with the intermediate clamping of the coupling element and/or the eccentric sleeve by means of a clamping anchor extending with radial clearance through holes in the shank part and in the cross-coupling element and engaging a thread on the head part and supported against an abutment in the area of the shank part.

2. The tool according to claim 1, wherein the longitudinal axis of the fitting hole receiving the fitting pin of the shank part is aligned with the axis of rotation of the tool.

3. The tool according to claim 1, wherein the cross-coupling element arranged inside of the eccentric sleeve is constructed as an annular piece with pairs of claws axially projecting to both sides and angularly spaced at 90° relative to one another.

4. The tool according to claim 1, wherein the claw flanks of the cross-coupling element widen inclined from their root toward their tip.

5. The tool according to claim 1, wherein the shank part has a stepped hole, and wherein between a shoulder of the stepped hole and a head of the clamping anchor there are arranged spring means preferably constructed as a set of springs.

6. The tool according to claim 5, wherein a spacer ring is arranged between the clamping-anchor head and the set of springs.

7. The tool according to claim 5, wherein the stepped hole is closed off with an end screw on the side of the clamping-anchor head.

8. The tool according to claim 7, including a fill piece filling the stepped hole and preferably consisting of a heavy material, like lead.

9. The tool according to claim 1, including a coupling part connectable to the end of the shank part on the side of the spindle, with a flat surface arranged on the side of the spindle and perpendicular with respect to the axis of rotation of the tool and with a fitting pin projecting axially beyond the flat surface.

10. The tool according to claim 9, at least one of the clamping anchor and the fill piece, the end screw and the coupling part have an axial cooling-medium channel leading to the chip flute of the tool.

11. The tool according to claim 10, wherein the clamping anchor can be adjusted in its clamping force by means of an adjusting tool insertable through the cooling-medium channel.

12. The tool according to claim 5, wherein the clamping-anchor head has a peripheral groove to receive an elastic gasket ring resting against the inner surface of the stepped hole.

13. The tool according to claim 1, including an elastic gasket ring resting on oppositely lying faces of the end screw and of the clamping-anchor head and sealing off the cooling-medium channel to the exterior.

14. The tool according to claim 13, wherein the gasket ring is supported in radial direction on an axially projecting hollow pin formed on the clamping-anchor head.

15. The tool according to claim 9, including an elastic gasket ring resting on oppositely lying faces of the shank part and of the coupling part and supported in radial direction on the end screw projecting beyond the shank part.

16. The tool according to claim 1, wherein the eccentric sleeve has an outer multi-surface section for the engagement by an adjusting wrench.

17. The tool according to claim 1, wherein the eccentric sleeve carries a scale ring at its end facing toward the shank part or toward the head part.

18. The tool according to claim 1, wherein the cutting support is fixedly and radially adjustably arranged on the head part.

* * * * *